United States Patent
Osindero

(10) Patent No.: US 9,940,547 B2
(45) Date of Patent: Apr. 10, 2018

(54) MEDIA CONTENT ANALYSIS SYSTEM AND METHOD

(71) Applicant: YAHOO HOLDINGS, INC., Sunnyvale, CA (US)

(72) Inventor: Simon Osindero, San Francisco, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 15/431,081

(22) Filed: Feb. 13, 2017

(65) Prior Publication Data

US 2017/0154245 A1 Jun. 1, 2017

Related U.S. Application Data

(63) Continuation of application No. 14/824,561, filed on Aug. 12, 2015, now Pat. No. 9,569,696.

(51) Int. Cl.
*G06K 9/62* (2006.01)
*G06K 9/46* (2006.01)

(52) U.S. Cl.
CPC ......... *G06K 9/6256* (2013.01); *G06K 9/6269* (2013.01); *G06K 9/4671* (2013.01); *G06K 2009/4666* (2013.01)

(58) Field of Classification Search
USPC ....... 382/157, 159, 160; 1/1; 40/1.5; 283/81; 428/40.1; 704/9; 706/16; 707/709
See application file for complete search history.

(56) References Cited

U.S. PATENT DOCUMENTS

| | | | |
|---|---|---|---|
| 6,081,766 A | 6/2000 | Chapman et al. | |
| 7,109,464 B2 | 9/2006 | Cartlidge et al. | |
| 7,151,246 B2 | 12/2006 | Fein et al. | |
| 7,248,716 B2 | 7/2007 | Fein et al. | |
| 7,338,168 B2 | 3/2008 | Cartlidge et al. | |
| 8,909,617 B2* | 12/2014 | Wang | G06F 17/3089 707/709 |
| 9,098,923 B2* | 8/2015 | Emeott | G06T 7/90 |
| 9,451,335 B2* | 9/2016 | Gopalan | H04N 21/84 |
| 9,519,858 B2* | 12/2016 | Zweig | G06N 3/04 |
| 9,569,696 B1* | 2/2017 | Osindero | G06K 9/66 |
| 2014/0229158 A1* | 8/2014 | Zweig | G06N 3/04 704/9 |

\* cited by examiner

*Primary Examiner* — Anh H Do
(74) *Attorney, Agent, or Firm* — James J. DeCarlo; Greenberg Traurig, LLP

(57) ABSTRACT

Disclosed herein is an intelligent agent to analyze a media object. The agent comprises a trained model comprising a number of state layers for storing a history of actions taken by the agent in each of a number of previous iterations performed by the agent in analyzing a media object. The stored state may be used by the agent in a current iteration to determine whether or not to make, or abstain from making, a prediction from output generated by the model, identify another portion of the media object to analyze, end analysis. Output from the agent's model may comprise a semantic vector that can be mapped to a semantic vector space to identify a number of labels for a media object.

19 Claims, 6 Drawing Sheets

MEDIA CONTENT ANALYSIS SYSTEM AND METHOD

CROSS REFERENCE TO RELATED APPLICATIONS

This application is a continuation of and claims priority from co-pending U.S. patent application Ser. No. 14/824,561, filed Aug. 12, 2015, entitled MEDIA CONTENT ANALYSIS SYSTEM AND METHOD, now U.S. Pat. No. 9,569,696 which is hereby incorporated by reference.

FIELD OF THE DISCLOSURE

The present disclosure relates to analyzing media content, such as and without limitation photographs, audio recordings, video, etc., which media content analysis may be used, for example, to tag or label the media content, to estimate aesthetic quality of the media content, to identify important element(s) and intelligently crop or resize an image to preserve the important element(s), as well as other applications.

BACKGROUND

There is a vast amount of media objects available in digital form. A media object is typically stored in one or more media files. While the media files may be accessible to computer users it is difficult for them to discern the content of the media files and/or to locate the digital media of interest to them. Additionally, the quality and diversity of content of such digital media objects varies, which makes it even more difficult for the computer users to locate digital media objects of interest to them.

SUMMARY

The disclosed systems and methods remedy such shortcomings in the art and provide improved computer systems and methods instituting increased functionality to the computer executing the disclosed systems and methods by automatically identifying media content. As discussed below, the accurate characterization of media content can yield improvements in numerous technological fields, such as for example image search, content promotion and recommendation, image monetization, ad monetization, and/or content selection from a set of captured imagery, to name a few.

The present disclosure seeks to address failings in the art and to analyze a media object in a targeted and efficient way. By way of a non-limiting example, an input image that is 3000 pixels by 3000 pixels is too large to process with current technologies. In accordance with one or more embodiments of the present application, areas, e.g., a 300 pixel by 300 pixel sub window, of the large input image, or other media object, can be identified, analyzed and one or more semantic predictions can be made about the large image using the sub-window. Rather than downscaling the input image's resolution and trying to recognize an object of interest at a much lower resolution than the input image's actual resolution, embodiments of the present disclosure can analyze the original image using a number of sub-windows at the input image's actual resolution. In accordance with one or more embodiments, a low-resolution, subsampled scan, saliency map, or other low-resolution indicator of regions can be used to identify a region, or area, of interest in a media object, and the identified region can be analyzed at the original resolution.

While embodiments of the present application are describes with reference to an input image, it should be apparent that any type of media object is contemplated with one or more such embodiments. By way of some non-limiting examples, a media object may be an audio media object and a collection of snippets can be analyzed to identify a portion of the audio media object, the media object may be a video media object, and a selection of low-resolution frames from the vide may be used to identify a portion of the video media object, the media object may be a combination of audio and video, etc.

The present disclosure relates to analyzing media content, such as and without limitation photographs, audio recordings, video, etc., which media content analysis may be used, for example, to tag or label the media content, to estimate aesthetic quality of the media content, to identify important element(s) and intelligently crop or resize an image to preserve the important element(s), as well as other applications.

In accordance with one or more embodiments, a media object analysis agent, or media analyzer, comprises a model that is trained to mike decisions regarding which aspects of a media object to perform a detailed analysis. By way of a non-limiting example, a large image may be analyzed without incurring the cost of analyzing all of the high-resolution pixels of the image; the media analyzer can identify which portion(s) of the media object, such as small objects within the image, to conduct its analysis of the media object. In so doing, the media analyzer may ignore other portions of the media object that it determines are not as useful for the analysis thereby making the analysis more efficient. In accordance with one or more embodiments, a computational budget may be defined and used in optimizing the agent to perform within the defined budget.

In accordance with one or more embodiments, a method is provided, the method comprising using, by a computing device, a trained model as an agent to analyze a media object using a number of rounds of analysis, the trained model comprising a number of state layers to store an outcome from each round of analysis of the media object by the agent; making, by the computing device and using the agent, a determination in a current round of analysis of a next action to take in the analysis of the media object, the determination being made using a stored state from the number of state layers and results of the current round of analysis by the agent; and providing, by the computing device and using the agent, an output from the number of rounds of analysis of the media object, the output comprising a plurality of labels corresponding to the media object's content.

In accordance with one or more embodiments a system is provided, which system comprises at least one computing device, each computing device comprising a processor and a storage medium for tangibly storing thereon program logic for execution by the processor, the stored program logic comprising using logic executed by the processor for using a trained model as an agent to analyze a media object using a number of rounds of analysis, the trained model comprising a number of state layers to store an outcome from each round of analysis of the media object by the agent; making logic executed by the processor for making, using the agent, a determination in a current round of analysis of a next action to take in the analysis of the media object, the determination being made using a stored state from the number of state layers and results of the current round of analysis by the agent; and providing logic executed by the processor for providing, using the agent, an output from the number of rounds of analysis of the media object, the output comprising a plurality of labels corresponding to the media object's content.

In accordance with yet another aspect of the disclosure, a computer readable non-transitory storage medium is provided, the medium for tangibly storing thereon computer-readable instructions that when executed cause at least one processor to use a trained model as an agent to analyze a media object using a number of rounds of analysis, the trained model comprising a number of state layers to store an outcome from each round of analysis of the media object by the agent; make a determination, using the agent, in a current round of analysis of a next action to take in the analysis of the media object, the determination being made using a stored state from the number of state layers and results of the current round of analysis by the agent; and provide, using the agent, an output from the number of rounds of analysis of the media object, the output comprising a plurality of labels corresponding to the media object's content.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides a process flow example in accordance with one or more embodiments of the present disclosure.

FIG. 2 provides an example of layers of an illustrative convolutional neural network which can be trained by supervised learning.

FIG. 3 provides an example of an expanded model for use in accordance with one or more embodiments of the present disclosure.

FIG. 4 provides an agent process flow for use in accordance with one or more embodiments of the present disclosure.

DETAILED DESCRIPTION

Figure 1:
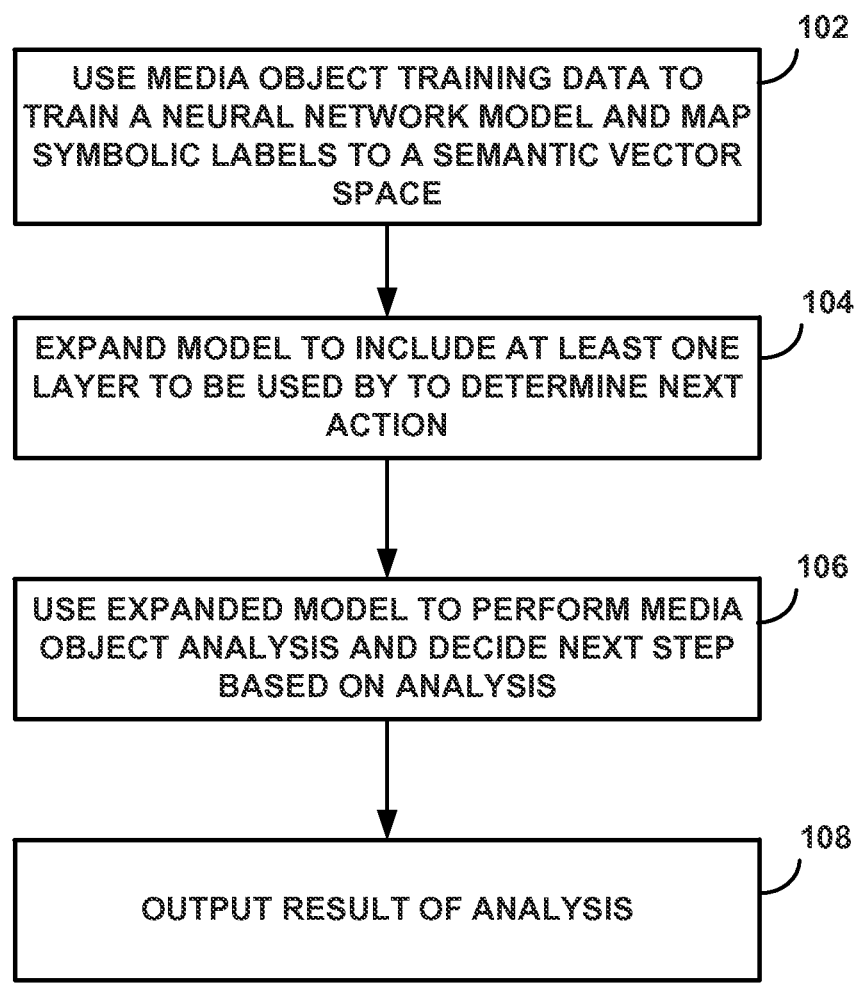

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

The disclosed systems and methods remedy shortcomings in the art and provide improved computer systems and methods instituting increased functionality to the computer executing the disclosed systems and methods by automatically identifying media content. As discussed below, the accurate characterization of media content can yield improvements in numerous technological fields, such as for example image search, content promotion and recommendation, image monetization, ad monetization, and/or content selection from a set of captured imagery, to name a few.

The present disclosure includes a media content analysis system, method and architecture. In accordance with one or more embodiments, an action-decision selection agent comprises a model that is trained to decide what action, or actions, to take given a current state. By way of a non-limiting example, the agent may be used to predict one or more labels, or tags, for an input image, and possible actions that the agent may decide to take include without limitation make a label prediction, abstain from making a label prediction, select a new, or next, location of the image to analyze, analyze the new, or next, portion of the image at a higher or lower resolution than one or more other previously-analyzed image portions, end the analysis, etc.

In accordance with one or more embodiments, the agent uses an internal state, which may comprise a history of its observations, e.g., observations made prior to the current one, as well as its history of actions and predictions. In its analysis of the input image, the agent can use its internal state to determine what action, or actions, to take, e.g., the agent may make a determination whether or not to continue analyzing the image, and if so what action should be taken to continue the analysis, e.g., what action is be taken in the next iteration in the analysis. In addition to the agent's internal state and in accordance with one or more embodiments of the present disclosure, the agent may use an indicator, or indicators, of potential regions of interest in the input image. By way of a non-limiting example, the agent may use a saliency map or other low-resolution indicator of possible regions of interest to identify a next portion or area of the input image to analyze. By way of a further non-limiting example, the model may be trained to identify the next portion of area of the input image to analyze.

FIG. 1 provides a process flow example in accordance with one or more embodiments of the present disclosure. At step 102, training data comprising a plurality of media objects, e.g., images, and metadata associated with the media objects is used to train a label prediction model and to map symbolic labels to a semantic vector space. By way of a non-limiting example, a symbolic label can correspond to one or more characters, words etc., and can comprise a number of features representing, e.g., the meaning, of the character(s), word(s), etc. By way of a non-limiting example, a word, such as sky, dog, car, etc., used to annotate an image may be expressed as a vector of values representing the meaning of the word.

In accordance with one or more embodiments, the label prediction model can comprise a neural network, e.g., a convolutional neural network, which is trained, at step 102, using supervised learning, e.g. using the training data comprising a plurality of media objects and associated metadata. By way of a non-limiting example, the convolutional neural network can be trained using a gradient descent algorithm to learn the network's parameters, such as the weights associated with each node and biasing, and backpropagation, the latter of which can be used to determine the gradients for the gradient descent algorithm. The convolutional neural network can comprise a network of connected nodes and a set of parameters comprising a connection strength, or weight, between each pair of nodes and a bias associated with each node. By way of a non-limiting example, each input to a node can have an associated weight and the output of a node can be determined using each weighted input and a bias associated with the node.

Figure 2:
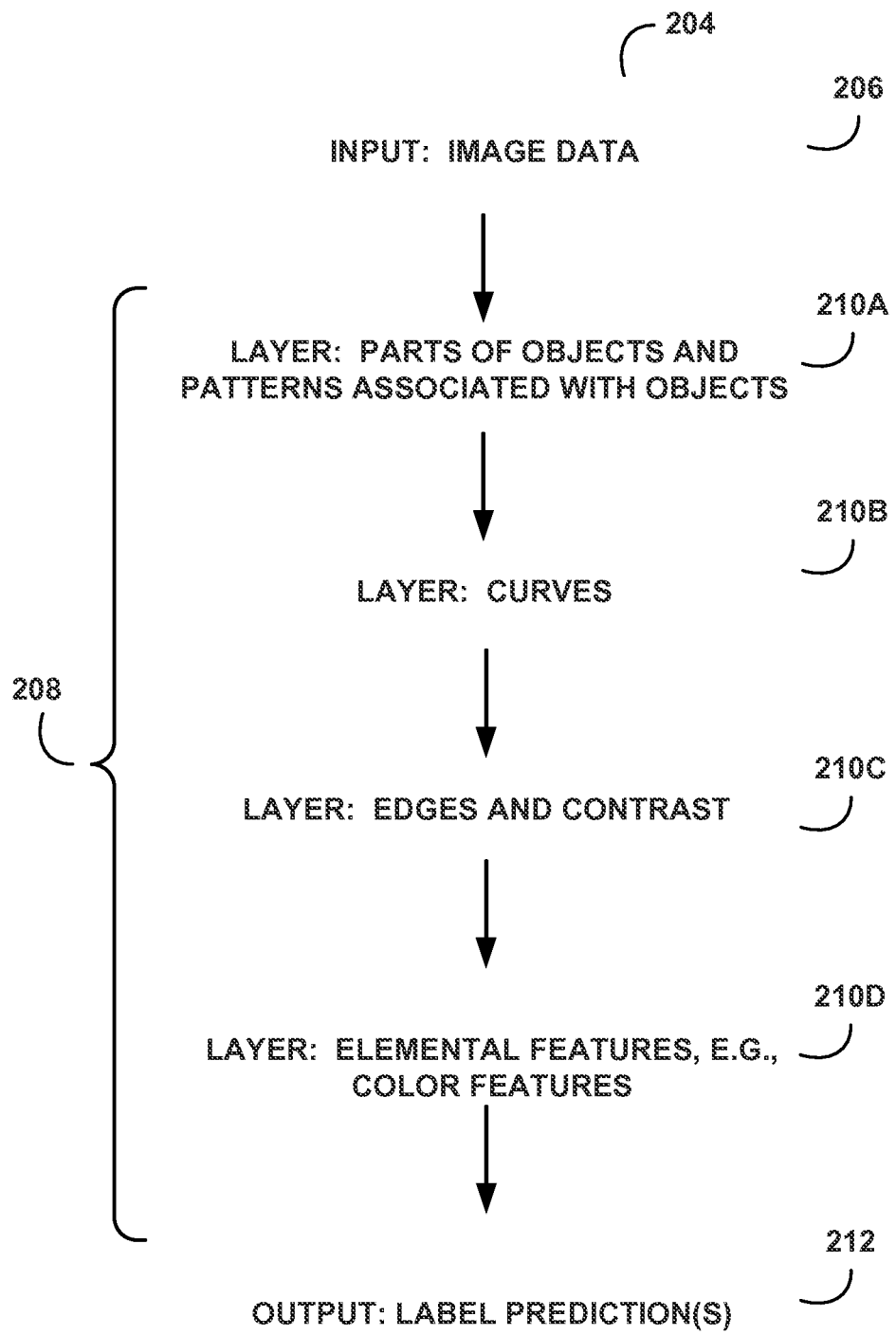

FIG. 2 provides an example of layers of an illustrative convolutional neural network which can be trained by supervised learning. In accordance with at least one embodiment, convolutional neural network 204 comprises an input layer 206, inner layer 208 comprising one or more layers, and output layer 212. By way of a non-limiting example, a media object such as an image is input via layer 206 to the neural network 204 and is analyzed using layer(s) 208, which provide input to output layer 212, which identifies a number of label predictions. In accordance with one or more embodiments, output layer 212 can comprise a prediction for each label of a number of labels, and each label's prediction can comprise a measure of the probability, or likelihood, that the label is representative of the image's content. By way of a non-limiting example, assuming that the image data 206 is an image that includes a cloud in the sky, neural network 204 can identify the labels "sky" and "cloud" as two labels that can be used for the image. In accordance with one or more embodiments, output layer 212 can output one or more symbolic labels, each of which comprises a vector comprising a number of semantic features representing a label, or labels.

In accordance with one or more embodiments, a semantic vector space can be generated, at step 102 of FIG. 1, using a corpus, such as labels associated with the media objects in the training data. Other data such as and without limitation words from Wikipedia and other sources may be included in the corpus. A tool, such as and without limitation word2vec, can use the corpus to construct a vocabulary and learn a vector representation for words, characters, etc. By way of a non-limiting example, a vector representation for each label associated with a media object, as well as other words, characters, etc., can be generated for the semantic vector space.

By way of a non-limiting example, each label can be mapped to a point in the semantic vector space using its vector representation, and a determined distance, e.g., a cosine distance, can be used as a measure of the semantic similarity between the two labels.

In accordance with one or more embodiments, neural network 204 trained at step 102 is a teed forward neural network, such that output from one layer is fed as input to another layer. With reference to neural network 204, layers in the neural network 204 can use information from another layer. By way of some non-limiting examples, inner layer 208 can use information provided by input layer 206 and output layer 212 can use information provided by inner layer 208. By way of a further non-limiting example, inner layer 210B of inner layer 208 can use information provided by inner layer 210A, inner layer 210C can use information provided by inner layer 210B, etc.

In the example shown in FIG. 2, each inner layer 208 of neural network 104 can comprise a number of nodes, which can be used to extract features of the input, e.g., features of an input image. By way of some non-limiting examples, layer 210A can comprise a number of nodes configured to extract parts of objects depicted in the input image data, and patterns associated with depicted objects, layer 210B can comprise a number of nodes configured to extract curves, layer 210C can comprise a number of nodes configured to identify edges and contrast features, layer 210D can comprise a number of nodes configured to extract and identify elemental features, such as and without limitation color features. The nodes in each of the layers 210A-210D can make use of feature information extracted by another layer.

In accordance with one or more embodiments, output 212 can represent a label as a vector of features, which vector can be used to identify additional labels that are semantically similar to the label. In accordance with one or more embodiments, each label can be mapped, using its vector representation, into a semantic vector space, where neighboring labels in the semantic vector space can be considered to determine whether or not they are semantically similar to another label. In accordance with one or more embodiments, a determined distance, such as and without limitation a cosine distance, between two label's semantic vectors in the semantic vector space can be used as a measure of the semantic similarity between the two labels.

Referring again to FIG. 1, step 102 pre-trains the model, e.g., the convolutional neural network 204. At step 104, the pre-trained model is expanded to include a number of additional layers, which provide an internal state, or context, for the network. In accordance with one or more embodiments, the expanded model can be trained using output from step 102, such as and without limitation the neural network 204 and the mapping of label vectors to a semantic vector space. In accordance with one or more such embodiments, the expanded model can be a recurrent neural network training using a combination of backpropagation through time and policy-gradient methods.

The training data for the expanded model may further include, for a number of the media objects used to train neural network 204, a saliency map identifying salient areas in each media object. By way of a non-limiting example, a saliency map generated from an image depicting a bright red car, a green tree and a relatively non-descript background can be used to identify the areas of the image that depict the bright red car and green tree. In other words, a saliency map can be used to identify the area(s) in the image corresponding to the car and the tree as visually salient area(s) of the image. By way of a non-limiting example, a saliency map can be estimated for an image by computing local image entropies. In accordance with one or more embodiments, a saliency model can be used to predict saliency, e.g., a salient area of a media object.

In accordance with one or more embodiments, the expanded model generated at step 104 can include a new, or modified, set of parameters comprising a weight, or connection strength, between nodes and biases. In accordance with one or more embodiments, the expanded neural network can be a model, such as a recurrent neural network, which allows for the output of one or more nodes to be fed back as input to the same or other nodes in a subsequent analysis iteration performed by the model. At step 106, the expanded model is used to analyze media object input to make a number of label predictions and media object analysis decisions. At step 108, the expanded model generates output resulting from the media object analysis. In accordance with one or more embodiments, the output comprises a number of semantic concepts, such as and without limitation a number of semantic vectors each representing one or more labels. In accordance with one or more such embodiments, a semantic vector can map to an area of a semantic vector space and can be used to identify one or more labels corresponding to the vector as well as a number of semantically-similar labels in the proximity of the vector in the semantic vector space.

Figure 3:
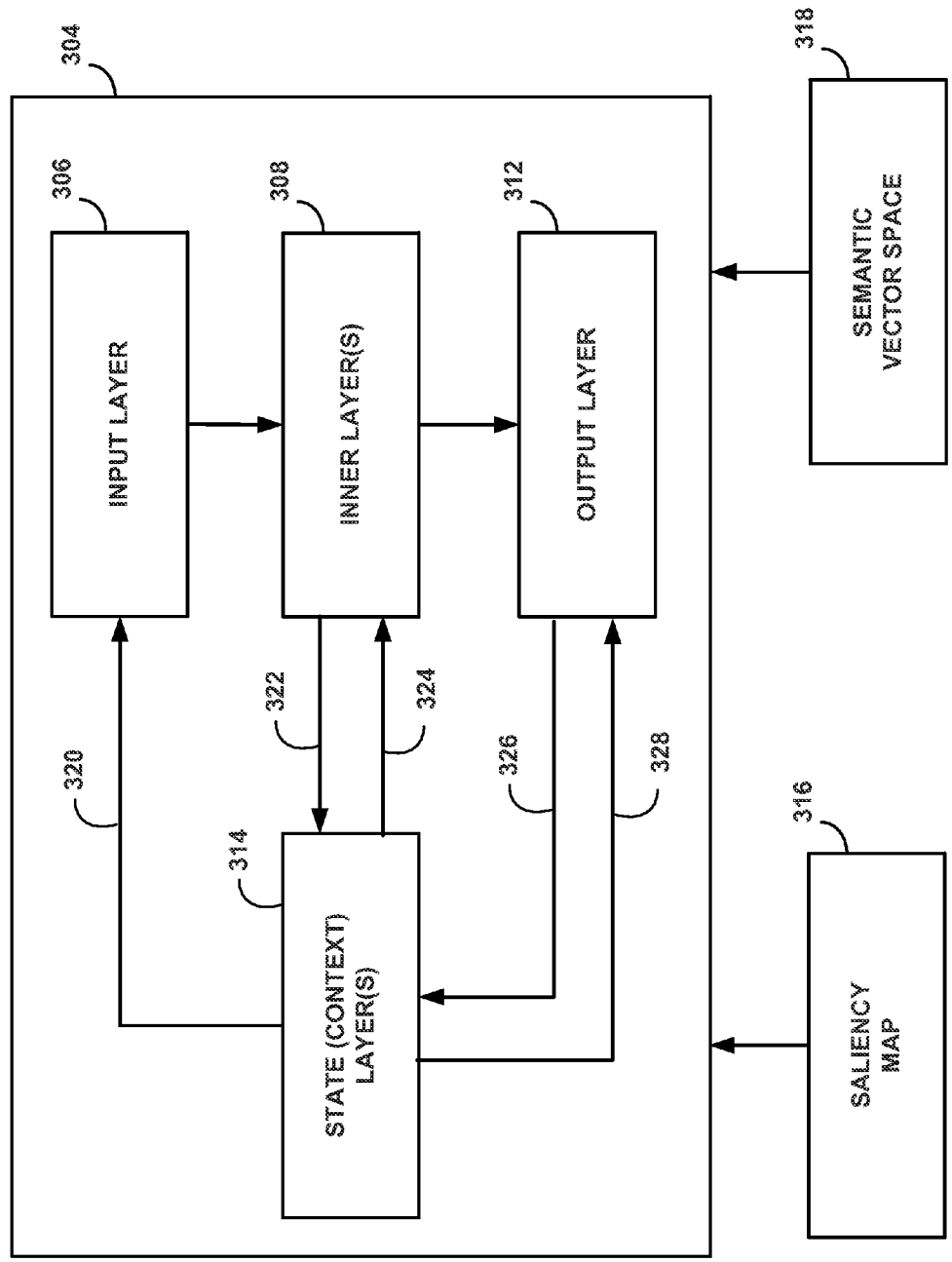

FIG. 3 provides an example of an expanded model for use in accordance with one or more embodiments of the present disclosure. In the example shown in FIG. 3, the expanded model 304 comprises an input layer 306, a number of inner, or hidden, layers 308 and an output layer 312. Additionally, the expanded model 304 includes a number of state, or context, layers 314. In accordance with one or more embodiments, the state layer(s) 314 can receive output from a node, or nodes, in inner layers) 304 and/or output layer 312, and can use the output to determine what action to take next.

In the example shown in FIG. 3, lines 322 and 326 represent output from the inner layer(s) 308 and output from the output layer 312, respectively, and lines 320, 324 and 328 represent input to the input layer 306, inner layer(s) 308 and output layer 312, respectively, from state layer(s) 314. By way of some non-limiting examples, input 320 can comprise image pixel data for an area of an image identified by the state layer(s) 314 for analysis by the expanded model 304, input 324 can comprise a modified weight for each node of a number of nodes in the inner layer(s) 308 and/or the output layer 312. Weights can be associated with input 324 and/or input 328.

In accordance with one or more embodiments, model 304 acts as an agent that executes a series of actions, decisions and predictions. In accordance with one or more such embodiments, the agent is aware of the observations made in prior iterations to the current one, as well as its history of actions and predictions. Such awareness can be manifested as an internal state of the agent, e.g., using layers 314 of model 304. By way of a non-limiting example, output 322 and/or 326 from a current analysis iteration, or round, of the model 304 acting as the agent can be stored as state information using the state layer(s) 314, and retained state information can be used to determine an action, or actions, to be taken by the model 304 in a succeeding iteration, or iterations. In each round, or iteration, model 304 can decide where to look next. By way of a non limiting example, in the case of an image, such a decision can comprise determining a bounding box into an original high-resolution image, and the region identified by the bounding box can then be processed by the model 304 in one round of analysis done by the model 304. The results of the analysis may be used to update the state and make a determination as to what action to be taken next. By way of some non-limiting examples, actions may comprise identifying another area for analysis, predicting a new label, abstaining from predicting a new label, and/or making a determination to end analysis.

In accordance with one or more embodiments, model 304 can be used to make multiple predictions for a piece of media in a targeted and efficient way. By way of a non-limiting example, large input images that would otherwise be too large to process can be iteratively processed, e.g. processing one or more 300×300 sub windows of the original image. In such a case, rather than downscaling the original image and then trying to recognize an object of interest in a tiny region of the downsized image, model 304 can be used to hone in on the region, or regions, of interest and focus there to make a prediction, or predictions, using a higher resolution, the image's original resolution. Embodiments of the present disclosure train model 304 to make decisions on which aspects of the image to perform a detailed analysis. By honing in on the region(s) of interest, the cost of analyzing an image, and in particular a large high resolution image, can be avoided by eliminating the need to analyze all of the high resolution pixels of the image. In accordance with one or more embodiments, model 304 can be optimized to perform its analysis in accordance with a computational budget.

In accordance with one or more embodiments, model 304 can use a saliency map 316 of an image being analyzed by the model 304 to determine an area, or areas of the image to be analyzed by the model 304. In accordance with one or more embodiments, output from layer 312 can be in the form of a semantic concept, such as and without limitation a vector that maps to a location in semantic vector space 318 corresponding to label. In accordance with one or more embodiments, the semantic vector space 318 can be generated at step 102 of FIG. 1.

In accordance with one or more embodiments, model, or agent, 304 takes a media object, such as and without limitation an image, photograph, video frame, etc., or some portion thereof as input to its input layer and executes a number of iterations, or rounds, to identify a number of labels for the input image. By way of a non-limiting example, the input can be an N×N block of pixels of an image identified using saliency map 316. In accordance with one or more embodiments, saliency map 316 can be used to identify a salient portion of the media object to be input to model 304. While saliency map 316 is used in the example shown in FIG. 3 to assist model 304 in identifying input, in accordance with one or more embodiments of the present disclosure, model 304 can be trained to identify salient areas of a media object.

In accordance with one or more embodiments, model 304 maintains the agent's state, via the state layer(s) 314, integrates world knowledge provided by the training data and makes both predictions and action decisions. By virtue of the maintained state, the agent is aware of the observations made in prior iterations as well as a history of actions and predictions made in iterations previous to the current one.

Figure 4:
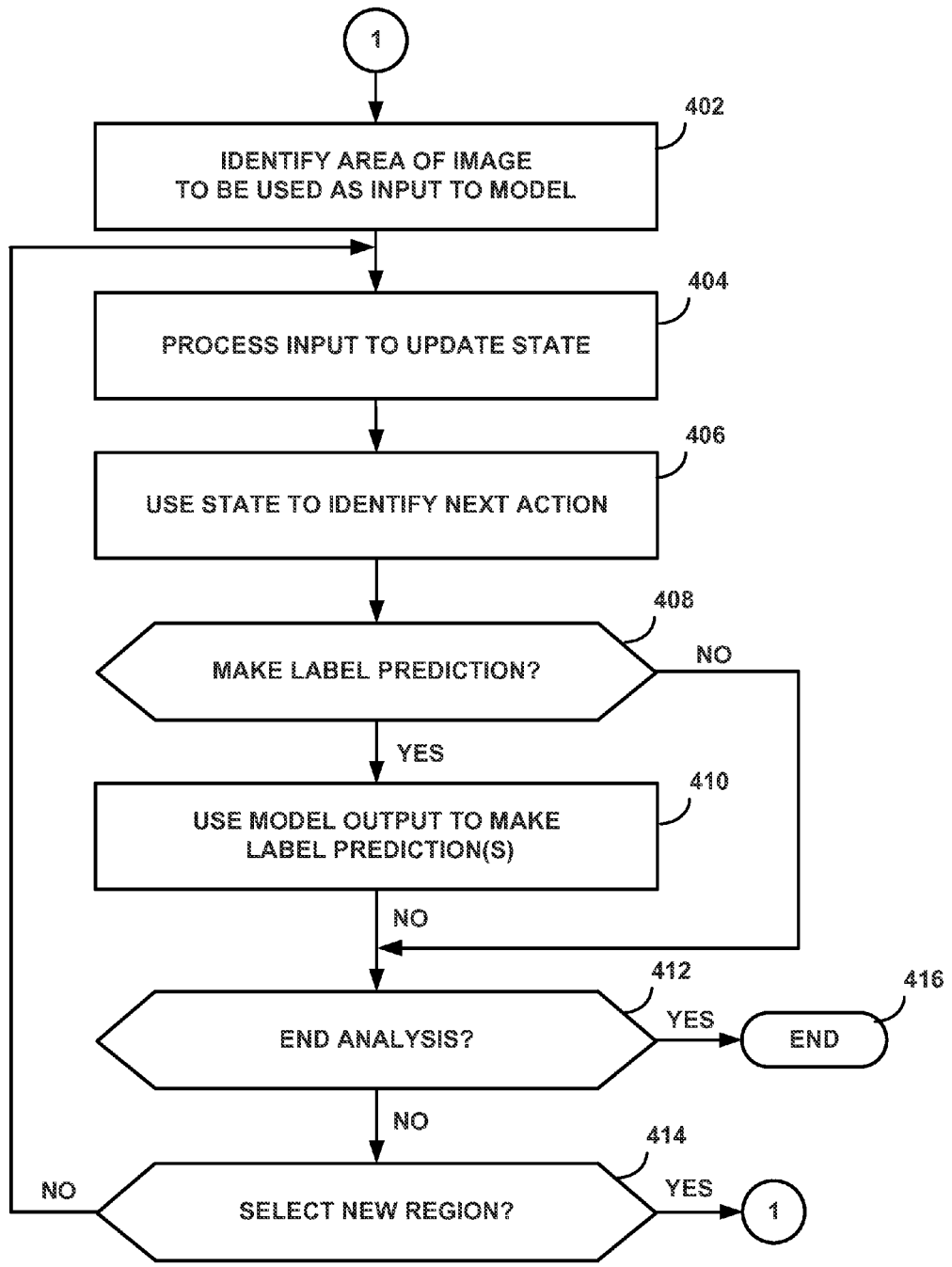

FIG. 4 provides an agent process flow for use in accordance with one or more embodiments of the present disclosure. By way of a non-limiting example, the agent process flow is performed by model 304 implemented in software, hardware or some combination of software and hardware. By way of a further non-limiting example, some or all of the agent, including the trained model, may be implemented using a programming language such as and without limitation C++, Java®, etc. An image is used as the media object in the example shown in FIG. 4. It should be apparent that any media object, or other input, may be used in connection with embodiments of the present disclosure.

At step 402, the agent identifies an area of an input image to be analyzed in the current round. The area may comprise some or all of the pixels of the input image. In accordance with one or more embodiments, the agent may use saliency map 316, or other indicator, to identify an area of interest of the input image. By way of a non-limiting example, a saliency map 316 may identify local image entropies, e.g., pixel variations, which can be used to identify potentially interesting areas of the image for analysis.

At step 404, the input, e.g., pixel data of the identified area, becomes input to input layer 306, which feeds the input to the inner layer(s) 308 in accordance with the weights and biases learned from the training of the model 304. The input to the inner layer(s) 308 is processed, e.g., the input layer(s) 308 processes the received input to extract features and analyze the features using a number of convolution kernels at a number of nodes of the input layer(s) 308, and output from the inner layer(s) 308 is fed forward to the output layer 312. The output can comprises a number of semantic vectors mapped to semantic vector space 318.

The state layer(s) 314 can be updated in accordance with the output from the inner layer(s) 308 and/or the output layer 312, and, at step 406, the agent uses its state to identify what action, or actions, to take, such as and without limitation whether to end or continue analysis, whether to make or abstain from making a label prediction, whether or not to select a new area to analyze, etc.

At step 408, the agent makes a determination whether or not to make a label prediction, or predictions. By way of some non-limiting examples, the agent may determine that the output provided by the output layer 312 in the current round is duplicative of output provided by the output layer 312 in a previous round, the agent may determine that a label cannot be identified using the output provided by the output layer 312, etc. By way of a further non-limiting example, the agent may decide to abstain from making a label prediction using the semantic vector space determined at step 102 of FIG. 1 and a semantic vector, or vectors, output by output layer 312.

If the agent makes a determination to make a label prediction from the output provided by the output layer 312 in the current round, the agent can use the output, e.g., in the form of a semantic vector, as a map into semantic vector space 318 to identify one or more labels, such as and without limitation one or more labels closest to, or within a given distance of, a point, region, area, etc. In the vector space 318 identified by the semantic vector output by output layer 312.

At step 412, the agent uses state information provided by a number of layers of the neural network to determine whether or not to end the analysis. By way of some non-limiting examples, the agent may end the analysis where there are no further areas of the image to be analyzed, where a satisfactory number of labels have been identified, where a number of iterations or rounds have been performed, etc. If the agent makes a determination to end the analysis, processing ends at step 416.

If the agent makes a determination, at step 412, to perform another round, or iteration, of analysis to further analyze the input image, processing continues at step 414 to determine whether or not to select a new region of the image to analyze. By way of some non-limiting examples, the agent may elect to further analyze the current region, e.g., to analyze the region using a higher resolution version of the region, assign different weights for a number of the nodes of the input layer(s) 308 and/or output layer 312, etc. If the agent elects to further analyze the current region, processing continues at step 404. If the agent elects to identify another area of the image to be used as input to the model, processing continues at step 402.

Figure 5:
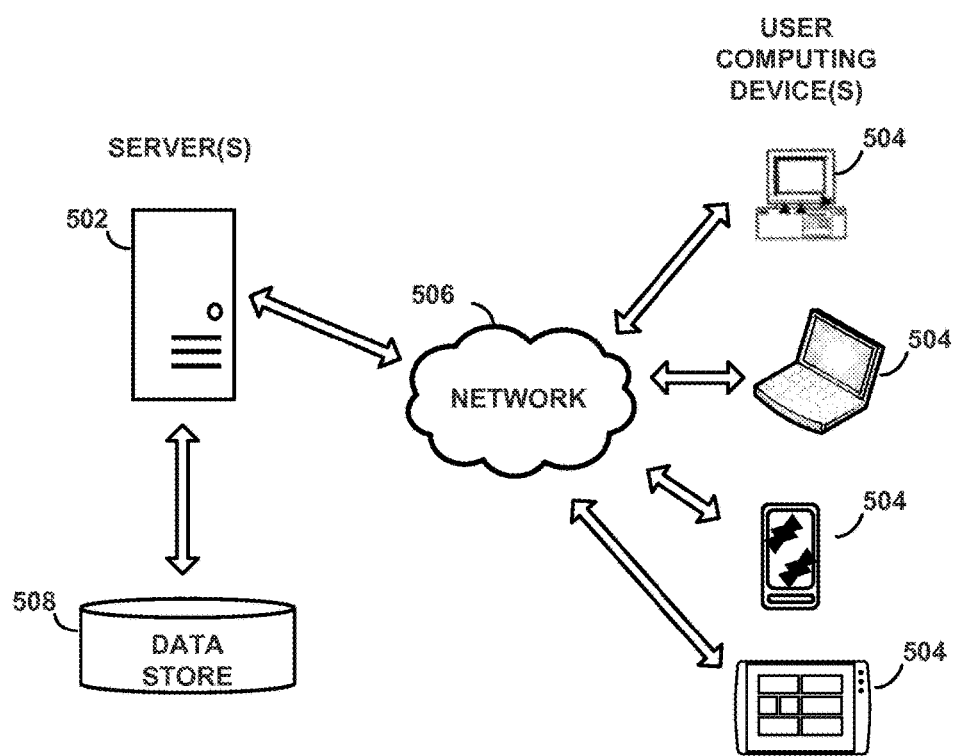
FIG. 5 illustrates some components that can be used in connection with one or more embodiments of the present disclosure.

FIG. 5 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 502 can be configured to execute program code, instructions, etc. to provide functionality in accordance with one or more embodiments of the present disclosure. The same or another computing device 502 may be configured to execute program code to implement functionality in accordance with one or more embodiments of the present disclosure.

Computing device 502 can serve content to user computing devices 504 using a browser application via a network 506. Data store 508 can be used to store program code to configure a server 502 to functionality in accordance with one or more embodiments of the present disclosure.

The user computing device 504 can be any computing device, including without limitation a personal computer, personal digital assistant (PDA), wireless device, cell phone, internee appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computing device 504 can include one or more processors, memory, a removable media reader, network interface, display and interface, and one or more input devices, e.g., keyboard, keypad, mouse, etc. and input device interface, for example. One skilled in the art will recognize that server 502 and user computing device 504 may be configured in many different ways and implemented using many different combinations of hardware, software, or firmware.

In accordance with one or more embodiments, a computing device 502 can make a user interface available to a user computing device 504 via the network 506. The user interface made available to the user computing device 504 can include content items, or identifiers (e.g., URLs) selected for the user interface in accordance with one or more embodiments of the present disclosure. In accordance with one or more embodiments, computing device 502 makes a user interface available to a user computing device 504 by communicating a definition of the user interface to the user computing device 504 via the network 506. The user interface definition can be specified using any of a number of languages, including without limitation a markup language such as Hypertext Markup Language, scripts, applets and the like. The user interface definition can be processed by an application executing on the user computing device 504, such as a browser application, to output the user interface on a display coupled, e.g., a display directly or indirectly connected, to the user computing device 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANS), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 5. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 6:
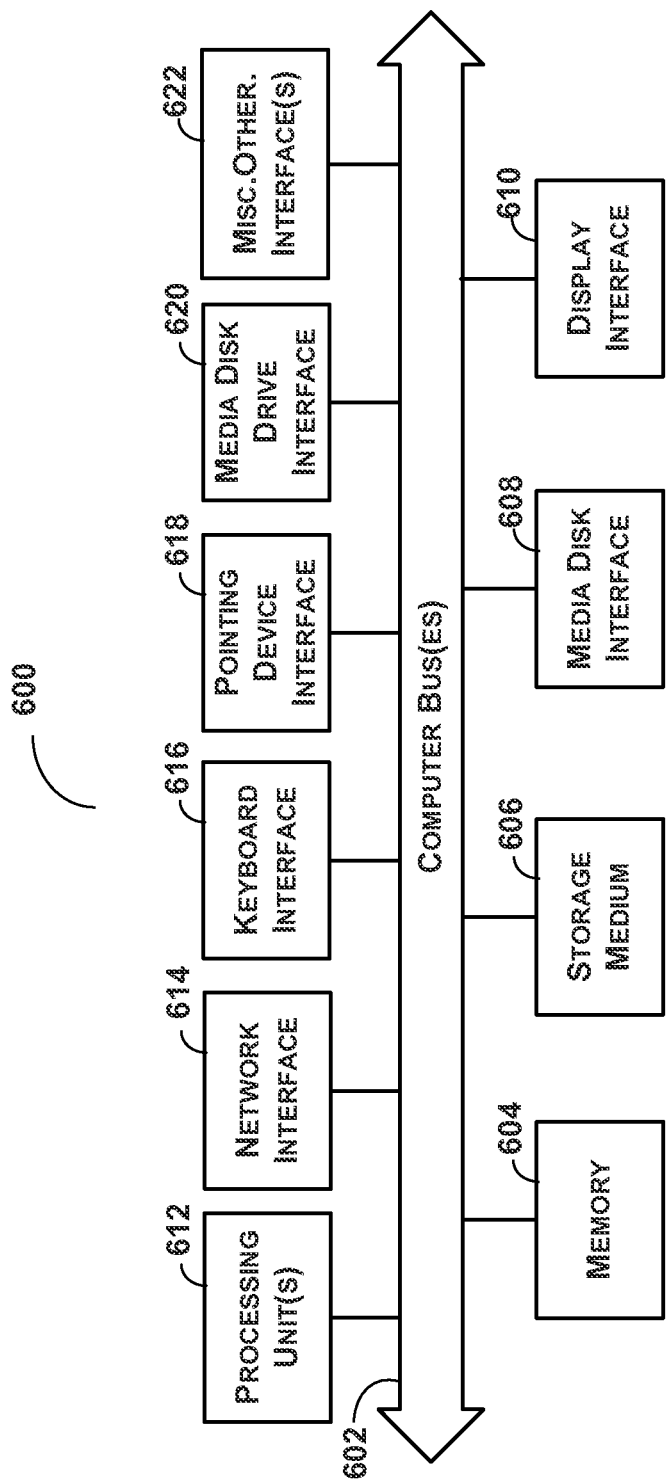
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 502 or user computing device 504, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 620 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device, CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:

using, by a computing device, a trained model as an agent to analyze a media object using a number of rounds of analysis, the trained model comprising a network of interconnected nodes and a number of state layers to store an outcome from each round of analysis of the media object by the agent, the interconnected nodes being interconnected via a number of connections of the network, each connection of the number having an associated weight;

making, by the computing device and using the agent, a determination from a current round of analysis of the media object by the agent to perform a subsequent round of analysis of the media object by the agent using a different associated weight for at least one connection of the number of connections of the network, the determination being made using a stored state from the number of state layers and results of the current round of analysis by the agent; and providing, by the computing device and using the agent, an output from the number of rounds of analysis of the media object, the output comprising a plurality of labels corresponding to content of the media object.

2. The method of claim 1, further comprising assigning, before performing the analysis of the media object by the agent in the subsequent round, the different associated weight for the at least one of connection of the number of connections of the network, the at least one connection being in at least one of an input layer, an inner layer and an output layer of the network.

3. The method of claim 1, further comprising performing the subsequent round of analysis on a region of the media object analyzed in the current round using a resolution different from that used to analyze the region of the media object in the current round.

4. The method of claim 3, the resolution different from that used to analyze the region of the media object in the current round is a higher resolution.

5. The method of claim 3, the resolution different from that used to analyze the region of the media object in the current round being a lower resolution version of a region of the media object analyzed in the current round.

6. The method of claim 1, further comprising performing the subsequent round of analysis on a region of the media object different from the region analyzed in the current round.

7. The method of claim 6, further comprising identifying the region of the media object different from the region analyzed in the current round using the trained model as the agent.

8. The method of claim 1, further comprising performing the subsequent round of analysis using a resolution different from that used to analyze the media object in the current round.

9. The method of claim 8, the resolution different from that used in the current round being a higher resolution version of a region of the media object analyzed in the current round.

10. The method of claim 8, the resolution different from that used in the current round being a lower resolution version of a region of the media object analyzed in the current round.

11. The method of claim 1, further comprising determining an output of a first interconnected node of the number of interconnected nodes using weighted input to the node, the weighted input being determined using the output of a second interconnected node and the associated weight of the connection interconnecting the first and second nodes.

12. The method of claim 11, the output of the interconnected node being further determined using a bias that is associated with the first interconnected node.

13. The method of claim 1, making a determination in a current round of analysis of analysis of the media object further comprising:
determining, by the computing device using the agent, whether or not to make a label prediction of at least one label for annotating the media object.

14. The method of claim 1, making a determination in a current round of analysis of analysis of the media object further comprising making a determination, using the stored state from the number of state layers and results of the subsequent round of analysis by the agent, whether or not to end the analysis of the media object by the agent.

15. A non-transitory computer-readable storage medium tangibly encoded with computer-executable instructions that when executed by a processor associated with a computing device perform a method comprising:
using a trained model as an agent to analyze a media object using a number of rounds of analysis, the trained model comprising a network of interconnected nodes and a number of state layers to store an outcome from each round of analysis of the media object by the agent, the interconnected nodes being interconnected via a number of connections of the network, each connection of the number having an associated weight;
making, using the agent, a determination from a current round of analysis of the media object by the agent to perform a subsequent round of analysis of the media object by the agent using a different associated weight for at least one connection of the number of connections of the network, the determination being made using a stored state from the number of state layers and results of the current round of analysis by the agent; and
providing, using the agent, an output from the number of rounds of analysis of the media object, the output comprising a plurality of labels corresponding to content of the media object.

16. The non-transitory computer-readable storage medium of claim 15, further comprising assigning, before performing the analysis of the media object by the agent in the subsequent round, the different associated weight for the at least one of connection of the number of connections of the network, the at least one connection being in at least one of an input layer, an inner layer and an output layer of the network.

17. The non-transitory computer-readable storage medium of claim 15, further comprising determining an output of a first interconnected node of the number of interconnected nodes using weighted input to the node, the weighted input being determined using the output of a second interconnected node and the associated weight of the connection interconnecting the first and second nodes.

18. The non-transitory computer-readable storage medium of claim 17, the output of the interconnected node being further determined using a bias that is associated with the first interconnected node.

19. A computing device comprising:
a processor;
a non-transitory storage medium for tangibly storing thereon program logic for execution by the processor, the program logic comprising:
using logic executed by the processor for using a trained model as an agent to analyze a media object using a number of rounds of analysis, the trained model comprising a network of interconnected nodes and a number of state layers to store an outcome from each round of analysis of the media object by the agent, the interconnected nodes being interconnected via a number of connections of the network, each connection of the number having an associated weight;
making logic executed by the processor for making, using the agent, a determination from a current round of analysis of the media object by the agent to perform a subsequent round of analysis of the media object by the agent using a different associated weight for at least one connection of the number of connections of the network, the determination being made using a stored state from the number of state layers and results of the current round of analysis by the agent; and
providing logic executed by the processor for providing, using the agent, an output from the number of rounds of analysis of the media object, the output comprising a plurality of labels corresponding to content of the media object.

* * * * *